United States Patent [19]

May

[11] Patent Number: 4,992,237

[45] Date of Patent: Feb. 12, 1991

[54] IGNITION OF SUSTAINED HIGH TEMPERATURE SYNTHESIS REACTIONS

[75] Inventor: William A. May, Boulder, Colo.

[73] Assignee: Amax Inc., Greenwich, Conn.

[21] Appl. No.: 469,112

[22] Filed: Jan. 24, 1990

[51] Int. Cl.$^5$ ............................................... B22F 1/00
[52] U.S. Cl. ...................................... 419/37; 419/45; 419/12; 419/57
[58] Field of Search ........................ 419/45, 12, 57, 37

[56] References Cited

U.S. PATENT DOCUMENTS

| | | | |
|---|---|---|---|
| 3,726,643 | 4/1973 | Merzhanov et al. | 423/409 |
| 4,446,242 | 5/1984 | Holt | 501/96 |
| 4,459,363 | 7/1984 | Holt | 501/96 |
| 4,710,348 | 12/1987 | Brupbacher et al. | 420/129 |
| 4,751,048 | 6/1988 | Christodoulou et al. | 420/129 |
| 4,772,452 | 9/1988 | Brupbacher et al. | 420/129 |
| 4,774,052 | 9/1988 | Nagle et al. | 420/129 |
| 4,778,649 | 10/1988 | Niino et al. | 419/45 |

OTHER PUBLICATIONS

Holt, "Combustion Synthesis: A New Area of Research in Materials Science", LLNL Brochure (LLL-TB-8-4-May 86).

Primary Examiner—Stephen J. Lechert, Jr.
Assistant Examiner—Leon Nigohosian
Attorney, Agent, or Firm—Hopgood, Calimafde, Kalil, Blaustein & Judlowe

[57] ABSTRACT

A process is provided for igniting a mixed powder material compact containing sufficient fuel to support an exothermic reaction between ingredients contained in the compact. The ignition is achieved in an inert atmosphere with an electric arc produced by an electrode without contacting the compact and thereby initiating the reaction.

6 Claims, No Drawings

IGNITION OF SUSTAINED HIGH TEMPERATURE SYNTHESIS REACTIONS

In my co-pending U.S. application Ser. No. 404,265 filed Sept. 7, 1989, the disclosure of which is incorporated herein by reference I described the production of a sponge material comprising an aluminum-base matrix metal having dispersed therethrough a high concentration of a finely divided refractory boride of the metals titanium, zirconium and hafnium useful as an addition agent for the production of composite alloys. In accordance with that disclosure, a powder mixture containing, for example, powders of titanium, aluminum, boron, and a coolant metal zinc may be compacted and then ignited in a protective atmosphere such as argon to produce by a sustained exothermic reaction a sponge of aluminum containing finely-divided titanium boride dispersed therethrough. The zinc is vaporized during the reaction and serves to cool the compact so as to prevent undesired growth of the dispersed boride. The technique can be used to provide a wide variety of unique monolithic ceramic and composite materials.

BACKGROUND OF THE INVENTION

As pointed out in my aforementioned co-pending U.S. application, an extensive art, including U.S. Pat. Nos. 3,726,643; 4,431,448; 4,710,348; 4,751,048; 4,772,452; and 4,774,052, is known which describes the production of metal-second phase composites by self-propagating high-temperature synthesis (SHS); i.e. an exothermic, self-sustaining reaction which propagates through a mixture of compressed powders until all the fuel for the reaction is consumed. Numerous combinations of materials have been utilized including, for example, mixtures of a metal from Groups II, V, and VI of the periodic system with a non-metal such as carbon, boron, silicon, sulfur, liquid nitrogen, etc. Titanium and carbon may be utilized. A hard alloy may be prepared by mixing titanium, boron and carbon with a Group IB binder metal such as copper or silver to produce an alloy comprising titanium diboride, titanium carbide and the binder metal. Ceramic or phase-forming constituents may be reacted in the presence of a solvent metal. Compound starting materials, as opposed to elemental starting materials may be employed. For example, Al $B_{12}$, Ti and Al powders may be blended, compacted and reacted to produce a composite comprising $TiB_2$ particles dispersed in an aluminum matrix. The proportions of ingredients may be widely varied.

In all of the methods and materials employed to date in SHS reactions, a common there is present, i.e. a mixture of reactant powders is compacted and the compact is ignited in a protective atmosphere such as argon.

The typical method for igniting SHS reactions is to contact compacted powders with a hot (typically tungsten) wire. A modification of this procedure comprises use of an induction coil to heat a graphite block which contacts the powder compact. Another method of ignition being used is a small electrical or chemical fuse.

In most cases, these methods work well under research conditions, but do not lend themselves readily to production scale-up. In the case of the tungsten wire, the wire is often destroyed upon ignition of the powders and must be replaced frequently. In addition, it has been observed that the hot wire approach will not always ignite compacts produced from powders with a particle size larger than 325 mesh (44 microns). The heated graphite block approach requires approximately one minute to heat the graphite block and initiate the reaction. Both of these methods could become quite time-consuming in a production mode.

The fuse method is not appropriate for two reasons. First the fuses are a lost raw material cost. Secondly, since the fuse must be buried in the material being reacted, each piece must be handled to insert the fuse. In addition, the fuse area is contaminated. Since many of these reactions are being used to produce near net shape monolithic parts (which are usually quite small) the chemical contamination, fuse costs and installation labor are prohibitive.

SUMMARY OF THE DISCLOSURE

In accordance with the invention, compacted materials capable of accomplishing sustained high temperature synthesis reactions are ignited in an inert atmosphere by an inert-gas stabilized arc such that no extraneous object other than the arc itself actually contacts the compact.

DETAILED DESCRIPTION OF THE INVENTION

A typical means for carrying out the invention will now be described.

In preparing a mixture for carrying out the process, it is preferred that the mixture be hydraulically pressed into a shape suitable for mass production movement through a reaction chamber. The reaction zone must be such that the compact is grounded. The "green" compact should have sufficient strength to be handled until reacted. A "walking beam" conveyor may be used for delicate green shapes and/or hot soft reacted masses so they are out of the way for the next reaction to proceed.

Compacts of a specified composition are reacted within a watercooled chamber or reactor capable of being closed substantially gas tight. The inert atmosphere is argon which is fed into one or both ends of the reactor. A water-cooled copper track extends the length and along the bottom of he reactor to the product hopper.

In one embodiment, the compacts are placed on the copper track and positioned in single file below a tungsten electrode similar to that used in TIG welding (tungsten inert gas welding).

The wafers are continually pushed through the reaction chamber, reacted and removed.

In accordance with the invention, the tungsten electrode does not touch the wafer, only the arc strikes the wafer or compact to ignite the SHS reaction. Typically, the tungsten electrode will have a diameter of about 1/16 to ¼ inches and will be sharpened to a point. A DC current at a voltage of about 10 to about 30 will strike the igniting arc against the compact which is grounded on the copper track. The arc gap will usually be about ⅛ to ¼ inches. Other voltages and arc gaps may be used in individual situations as those skilled in the art will understand. Numerous arcs, on the order of about 100 or more, e.g. even 1000, can be struck without materially affecting the tip geometry of the electrode since no physical contact occurs and arc duration is usually not more than about 0.1–10 seconds to ignite the SHS reaction.

It is to be appreciated in this connection that the compacted mixture usually will be sufficiently exothermic to start up the SHS reaction using a minimal heat source and that the reaction will propagate as long as fuel remains in the mixture. Reaction temperatures increase rapidly once ignition starts and will usually exceed 1500° to 2000° C. depending on the mixture composition.

An example will now be given:

Powder compacts measuring about 0.4 inch thick×2"×6" are prepared by pressing in a die at a pressure of about 10,000 psi a mixture of 240 parts titanium powder, 108 parts boron powder, 150 parts aluminum powder. All parts are by weight.

The compacts are reacted in an inert gas reactor of the type described hereinbefore by passing the compacts one after another beneath a tungsten electrode and striking an arc against each compact to ignite the compact electrothermically. In this case, the arc length is about 0.125 inches and the arc duration is about 0.5 seconds to ignite the compact in the argon atmosphere in the reactor.

The product is a sponge containing 70% by weight, of titanium diboride particles in an aluminum matrix. The sponge product is useful as an additive to most metal melts such as titanium to produce, for example, $TiB_2$ particles dispersed in a titanium aluminide matrix.

It will be appreciated that compacts treated in accordance with the invention usually will be conductive to heat and electricity and that they will be grounded on a metal support, such as copper when struck by an arc to initiate an exothermic reaction therein.

In the case of compacts which are non-conductive or insufficiently conductive the arc may be struck between the electrode and an anode such that the arc is in near proximity to the compact so as to initiate reaction.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The process for igniting a mixed powder material compact containing sufficient fuel to support an exothermic reaction between ingredients contained in said compact which comprises contacting said compact in an inert atmosphere with an electric arc produced by an electrode without contacting said compact and thereby initiate said reaction, said arc being applied for a period of about 0.1 to 10 seconds over an arc gap of about ⅛ to about ¼ inch.

2. The process in accordance with claim 1 wherein at least one of the ingredients in said powder compact is a metal and at least another one of the ingredients in said powder compact is a material capable of reacting exothermically with said metal.

3. The process in accordance with claim 1 wherein at least one of the ingredients in said powder compact is a solvent metal which becomes the matrix for the reaction product produced by said exothermic reaction.

4. The process in accordance with claim 1 wherein said mixed powder material compact also includes a sacrificial metal which vaporizes during said exothermic reaction and cools the compact.

5. The process in accordance with claim 1 wherein said compact is in contact with a water cooled copper support when struck with said arc.

6. The process in accordance with claim 1 wherein said compact is non-conductive and said arc is formed in near proximity to said compact by means of an anode on the opposite side of said compact from the source of said arc.

* * * * *